(12) United States Patent
Fetzer et al.

(10) Patent No.: US 11,525,810 B2
(45) Date of Patent: Dec. 13, 2022

(54) METHOD FOR ULTRASONIC INSPECTION OF STRUCTURE HAVING RADIUSED SURFACE USING MULTI-CENTRIC RADIUS FOCUSING

(71) Applicant: The Boeing Company, Chicago, IL (US)

(72) Inventors: Barry A. Fetzer, Renton, WA (US); Jill P. Bingham, Seattle, WA (US)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 16/796,280

(22) Filed: Feb. 20, 2020

(65) Prior Publication Data

US 2021/0262985 A1   Aug. 26, 2021

(51) Int. Cl.
 *G01N 29/24*  (2006.01)
 *G01N 29/265*  (2006.01)
 (Continued)

(52) U.S. Cl.
 CPC .......... *G01N 29/04* (2013.01); *G01N 29/24* (2013.01); *G01N 29/265* (2013.01); *G01N 29/44* (2013.01);
 (Continued)

(58) Field of Classification Search
 CPC ........ G01N 29/04; G01N 29/24; G01N 29/44; G01N 29/265; G01N 29/221;
 (Continued)

(56) References Cited

U.S. PATENT DOCUMENTS

| 4,848,159 A | 7/1989 | Kennedy et al. |
| 6,722,202 B1 | 4/2004 | Kennedy et al. |

(Continued)

FOREIGN PATENT DOCUMENTS

| CN | 113281415 | * 8/2021 | ............ G01N 29/04 |
| DE | 102008002450 A1 | 10/2009 | |

OTHER PUBLICATIONS

Extended European Search Report dated Jun. 17, 2021, in European Patent Application No. 21158244.0 (European counterpart of the instant U.S. patent application).

(Continued)

*Primary Examiner* — Jacques M Saint Surin
(74) *Attorney, Agent, or Firm* — Ostrager Chong Flaherty & Broitman P.C.

(57) ABSTRACT

Multi-centric radius focusing is used to inspect a radiused surface of a radiused part having a varying radius without mechanically adjusting the array sensor. A plurality of focal laws are designed to electronically steer and focus ultrasound at respective focal points corresponding to centers of curvature of a simulated radiused surface having a varying radius. The mechanical probe that carries the array sensor is located to two physical places that are outside of the radiused area and have a spatial relationship that varies less than the radius of the radiused surface varies. As the probe is moved along the radiused part, the probe maintains the array sensor at a constant location relative to the radiused part. As the array sensor scans the radiused part, the array sensor is electronically adjusted to focus at the respective focal points in sequence.

20 Claims, 13 Drawing Sheets

(51) Int. Cl.
*G01N 29/44* (2006.01)
*G01N 29/04* (2006.01)

(52) U.S. Cl.
CPC ............... *G01N 2291/0231* (2013.01); *G01N 2291/044* (2013.01); *G01N 2291/106* (2013.01); *G01N 2291/269* (2013.01)

(58) Field of Classification Search
CPC ............ G01N 29/069; G01N 29/0645; G01N 29/225; G01N 29/262; G01N 29/043; G01N 2291/0289; G01N 2291/269; G01N 2291/106; G01N 2291/262; G01N 2291/044; G01N 2291/0231; G01N 2291/2694
See application file for complete search history.

(56) References Cited

U.S. PATENT DOCUMENTS

| | | | |
|---|---|---|---|
| 6,789,427 B2 | 9/2004 | Batzinger et al. | |
| 6,993,971 B2 | 2/2006 | Bossi et al. | |
| 7,231,826 B2 | 6/2007 | Bossi et al. | |
| 7,337,673 B2 | 3/2008 | Kennedy et al. | |
| 7,484,413 B2 | 2/2009 | Georgeson et al. | |
| 7,836,768 B2 * | 11/2010 | Young | G01N 29/041 73/620 |
| 8,082,793 B2 | 12/2011 | Sarr et al. | |
| 8,402,830 B2 | 3/2013 | Kleinart et al. | |
| 8,444,087 B2 | 5/2013 | Kismarton | |
| 9,347,918 B2 * | 5/2016 | Bond-Thorley | G01N 29/262 |
| 9,366,655 B2 * | 6/2016 | Hutchinson | G01N 29/262 |
| 9,500,627 B2 | 11/2016 | Fetzer et al. | |
| 10,247,706 B2 * | 4/2019 | Hutchinson | G01N 29/262 |
| 2008/0121040 A1 | 5/2008 | MacLauchlan et al. | |
| 2009/0211361 A1 | 8/2009 | Young et al. | |
| 2010/0094606 A1 | 4/2010 | Richard et al. | |
| 2011/0100128 A1 | 5/2011 | Bond-Thorley | |
| 2013/0020144 A1 | 1/2013 | Troy et al. | |
| 2013/0197824 A1 | 8/2013 | Baba et al. | |
| 2013/0239689 A1 * | 9/2013 | Bbond-Thor | G01N 29/2456 73/625 |
| 2013/0298682 A1 | 11/2013 | Motzer et al. | |
| 2013/0340531 A1 | 12/2013 | Hutchinson et al. | |
| 2014/0051970 A1 | 2/2014 | Ebisawa et al. | |
| 2014/0095085 A1 | 4/2014 | Fetzer et al. | |
| 2014/0130617 A1 | 5/2014 | Nelson et al. | |

OTHER PUBLICATIONS

Habermehl et al., "Ultrasonic Phased Array Tools for Composite Inspection During Maintenance and Manufacturing," 17th World Conf. on Nondestructive Testing, Oct. 25-28, 2008, Shanghai, China.

Meyer et al., "Ultrasonic Testing Using Phased Arrays", http://www.ndt.net/article/wcndt00/papers/idn151/idn151.htm, Oct. 2, 2013.

* cited by examiner

METHOD FOR ULTRASONIC INSPECTION OF STRUCTURE HAVING RADIUSED SURFACE USING MULTI-CENTRIC RADIUS FOCUSING

BACKGROUND

This disclosure generally relates to methods and apparatus for ultrasonic inspection and, in particular, relates to methods and apparatus for ultrasonic inspection of composite structures having radiused surfaces.

The desire to maximize performance and minimize weight in commercial aircraft has resulted in widespread use of composite materials, such as fiber-reinforced plastic materials. A variety of elongated composite structures may have relatively confined internal cavities that require inspection in order to assure that the structure meets production and/or performance specifications. In many instances, those internal cavities are bounded in part by stiffeners, each stiffener comprising a web and a flange which meet at an intersection having one or more fillets. More generally, components made of fiber-reinforced plastic materials may have internal or external fillets.

In mechanical engineering, a fillet is a rounding of an interior or exterior corner of a part design. Fillet geometry, when on an interior corner, is a line of concave function, and when on an exterior corner, is a line of convex function. In the manufacture of composite parts, fillets are often referred to as "radii" because they typically have profiles which are circular arcs. To avoid confusion that may result from use of terminology such as the "radius of a radius", this disclosure adopts the conventions of referring to the fillet with circular profile as a "radiused surface" and referring to the radial dimension of the radiused surface as a "radius". As used herein, the term "circular arc" is a portion of the circumference of a circle. The circular arcs referred to herein are theoretical (e.g., simulated) constructions which may be defined mathematically in a frame of reference of a radiused part. For example, a circular arc may be defined mathematically such that non-parallel first and second planar surfaces of a radiused part—defined mathematically in a frame of reference of the radiused part—are theoretically tangent to the circular arc at opposing ends of the latter.

In the case of elongated composite structures, fabrication using soft tooling creates radiused surfaces whose radii vary along the length of the composite part. There are also many individual composite parts having radiused surfaces with unique radii. Whether inspecting multiple parts with different radii or a single part with multiple radii, operators consume large amounts of time to adjust their probes to the different radii. In addition, the designers of non-destructive inspection (NDI) systems have to design and fabricate unique probes that include an array of transducer elements (hereinafter "array sensor") for the variety of profiles of the radiused surfaces.

Existing methods for ultrasonic inspection of filleted corners of composite structures include the following: (1) physically adjusting the ultrasonic array sensor by an operator as the probe is moving along the radiused surface; (2) having a very complex mechanical design to move the array sensor during inspection, which design might include motorized mechanical adjustment, robotic articulation, dimensional feedback sensors, etc. (the drawbacks include costly inspection probes, costly maintenance, and costly re-teaching of robots due to system variability); (3) taking multiple scans of the radiused surface, each scan acquiring data with different adjustments to the setup files and/or adjustments to the array sensor (this increases cycle time); (4) taking a single scan with different array sensors placed at different locations (this increases system cost and inspection probe complexity); (5) using beam steering to direct ultrasonic beams to the radiused surface (this works to some degree but the data may not be good because the physical angle of the ultrasound into the part is not ideally normal to the part surface at all locations; (6) using ultrasonic beam steering methods to send sound at different angles into the radiused surface of the part, adjust the electronic beam steering based on the response, and then send sound again into the surface of the part with the newer electronic beams adjusted, which iterative process is repeated several times until a suitable signal response is obtained (which process may tend to mask surface irregularities that operators would want to see; another drawback is that the software algorithms are confused by unwanted reflections from irregularities located near the fillet).

The challenge is to provide a way to inspect a radiused surface of a composite part without having to mechanically adjust the array sensor, even though the radius changes. Examples would be wing skin stiffeners, fuselage stiffeners, or spar radii, where mechanically adjusting an array sensor during the inspection becomes very costly, time consuming, or creates a complicated mechanical system.

SUMMARY

The subject matter disclosed in some detail below is directed to a method and an apparatus for ultrasonic inspection of a composite part having a radiused surface using a phased ultrasonic transducer array (hereinafter "array sensor"). The method is designed with multiple focal points that correspond to centers of curvature of simulated curved profiles (e.g., circular arcs) of varying radius of a simulated radiused surface. Differentiating from traditional methods to inspect a structure or part having a radiused surface (hereinafter "radiused part") of varying radius, the method proposed herein requires no mechanical probe adjustment. Instead the method employs electronic adjustment of the focusing of ultrasonic waves (hereinafter "ultrasound") based on the dimensional design (simulation) of the radiused part. Because the scanning is developed to focus ultrasonic waves at different focal points (referenced to the different radii of the simulated radiused surface), that scanning is referred to herein as "multi-centric radius focusing".

In accordance with the embodiments disclosed below, multi-centric radius focusing may be used to inspect a radiused part having a varying radius without mechanically adjusting the probe. A plurality of focal laws are designed to electronically steer and focus ultrasound at respective focal points corresponding to centers of curvature of a simulated radiused surface having a varying radius. The mechanical probe that carries the array sensor is located to two physical places that are outside of the radiused area and have a spatial relationship that varies less than the radius of the radiused surface varies. As the probe is moved along the radiused part, the probe maintains the array sensor at a constant location relative to the radiused part. As the array sensor scans the radiused part, the array sensor is electronically adjusted to focus at the respective focal points in sequence.

The location of the center of the circular arc representing the profile of the radiused surface changes as the radius dimension changes along the length of the radiused surface, but the location of the array sensor relative to the web and flange need not change. Because radiused surfaces having different radii also have different centers of curvature, a respective focal law is created for each of a plurality of specified radii. Each focal law is created to electronically steer and focus an ultrasonic beam at a respective focal point. Multiple focal points are selected to encompass the anticipated range of radii in the as-fabricated variable-radius radiused part. The multi-centric radius focusing inspection technique disclosed herein may also accommodate overlap of the different focal laws so that a defect seen in the sensor data when one focal law is applied would also be seen in the sensor data when the next focal law is applied.

Multi-centric radius focusing may be applied to both internal and external radiused surfaces. Although this disclosure concentrates on a curved array sensor for best performance, the method may be applied using a linear (flat) array sensor as well.

Although various embodiments of methods and apparatus for ultrasonic inspection of a composite part using multi-centric radius focusing are described in some detail later herein, one or more of those embodiments may be characterized by one or more of the following aspects.

One aspect of the subject matter disclosed in detail herein is a method for inspecting a radiused part having non-parallel first and second planar surfaces connected by a radiused surface, the method comprising: (a) placing a probe body in a position relative to the radiused part such that a scan plane of an array sensor of transducer elements supported by the probe body intersects and is perpendicular to a lengthwise axis of the radiused surface; (b) pulsing respective apertures of the transducer elements of the array sensor to transmit a first plurality of beams focused at a first focal point and steered at respective steering angles in the scan plane, which first plurality of beams impinge on respective regions of the radiused surface; (c) after each beam of the first plurality of beams has been emitted, processing transducer output signals from the transducer elements of each aperture to derive a respective parameter value characterizing a strength of a respective echo returned from the radiused part following impingement of each beam of the first plurality of beams on the radiused surface; (d) pulsing respective apertures of the transducer elements of the array sensor to transmit a second plurality of beams focused at a second focal point and steered at respective steering angles in the scan plane, which second plurality of beams impinge on respective regions of the radiused surface; and (e) after each beam of the second plurality of beams has been emitted, processing transducer output signals from the transducer elements of each aperture to derive a respective parameter value characterizing a strength of a respective echo returned from the radiused part following impingement of each beam of the second plurality of beams on the radiused surface, wherein the first focal point is collocated at a first center of curvature of a first circular arc having a first radius, the second focal point is collocated at a second center of curvature of a second circular arc having a second radius which is different than the first radius, and the first and second circular arcs are calculated in a frame of reference of the radiused part so that the first and second planar surfaces of the radiused part are tangent to each of the first and second circular arcs Another aspect of the subject matter disclosed in detail hereinafter is an apparatus for inspecting a radiused part, the apparatus comprising: an array sensor of transducer elements; a probe body that holds the array sensor of transducer elements; and a pulser/receiver device programmed to perform operations comprising: (a) pulsing transducer elements of the array sensor in accordance with a first transmit focal law which is calculated to cause the array sensor to emit a first beam focused at a first focal point located along a centerline of the array sensor; (b) after the first beam is emitted, processing transducer output signals from the transducer elements in accordance with a first receive focal law which is calculated to cause the array sensor to derive a first parameter value characterizing a strength of an echo received following impingement of the first beam on a radiused surface of the radiused part; (c) pulsing transducer elements of the array sensor in accordance with a second transmit focal law which is calculated to cause the array sensor to emit a second beam focused at a second focal point located along the centerline of the array sensor; and (d) after the second beam is emitted, processing transducer output signals from the transducer elements in accordance with a second receive focal law which is calculated to cause the array sensor to derive a second parameter value characterizing a strength of an echo received following impingement of the second beam on the radiused surface, wherein the first focal point is at a first distance from a center of the array sensor and the second focal point is at a second distance from the center of the array sensor which is different than the first distance A further aspect is a method for inspecting a radiused part, the method comprising: (a) generating a cross-sectional model of a probe in contact with a radiused part comprising first and second surfaces connected by a radiused surface, the probe comprising an array sensor of transducer elements, the cross-sectional model comprising first and second lines representing respective profiles of the first and second surfaces and a plurality of circular arcs which span an expected range of variation of a radius of the radiused surface of the radiused part, each of the circular arcs terminating at the first and second lines; (b) calculating a set of transmit focal laws which, when executed, will cause the array sensor to emit a plurality of beams focused at a plurality of focal points located at different distances from a center of the array sensor, wherein the plurality of focal points correspond to respective centers of the plurality of circular arcs located at different distances from a center of a simulated array sensor of transducer elements; (c) calculating a set of receive focal laws which are designed to cause the array sensor to derive a plurality of parameter values characterizing strengths of echoes received following impingement of the plurality of beams on a radiused surface of the radiused part; (d) placing the probe in a position relative to the radiused part that conforms to the relative position represented by the cross-sectional model; (e) pulsing respective apertures of the transducer elements of the array sensor to transmit a plurality of beams respectively focused at the plurality of focal points in accordance with the set of transmit focal laws; and (f) after each beam of the plurality of beams is emitted, processing transducer output signals from the transducer elements in accordance with the set of receive focal laws to derive a set of parameter values characterizing strengths of echoes received following impingement of the plurality of beams on the radiused surface of the radiused part.

Other aspects of methods and apparatus for ultrasonic inspection of a composite part using multi-centric radius focusing are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

In FIGS. 10-14, the array sensor is curved; in FIG. 15, the array sensors are linear. In FIGS. 10-12, the radiused surfaces are concave; in FIGS. 13-15, the radiused surfaces are convex.

Reference will hereinafter be made to the drawings in which similar elements in different drawings bear the same reference numerals.

DETAILED DESCRIPTION

For the purpose of illustration, methods and apparatus for ultrasonic inspection of a composite part using multi-centric radius focusing will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For ultrasonic inspection of composite structure, the ultrasound beam should ideally enter at 90 degrees to the local surface of the composite part being inspected. If the beam does not enter at 90 degrees, the beam will be refracted off normal and a return echo from any possible internal structure or anomaly will not be optimum. Traditionally a 90-degree entry angle is maintained by holding an array sensor at a precisely fixed position in space relative to the surface.

A process for non-destructive inspection of radiused parts having a varying radius will now be described. The process may, for example, be applied in inspection of elongated composite parts such as wing panel stringers made of fiber-reinforced plastic. The radius of a radiused surface of a filleted join region (intersection) of such an elongated composite part may be constant or vary along the length of the part.

Instead of mechanically adjusting a probe, multiple wavefronts are created by a computer-controlled array sensor to accommodate different radii and shapes of the radiused part. These multiple wavefronts are adjusted using ultrasonic beamforming application software. The transmission of multiple sets of ultrasound beams for inspecting radii of differing radius and shape is done electronically by phasing the elements in the array sensor(s) to cover the expected (i.e., predicted) surface of the part as well as the full range of radius variability. The phasing is done in accordance with predetermined focal laws. (As used herein, the term "focal laws" refers to the programmed pattern of time delays applied to pulses and outputs of individual transducer elements during formation of transmit and receive beams.)

Figure 1:
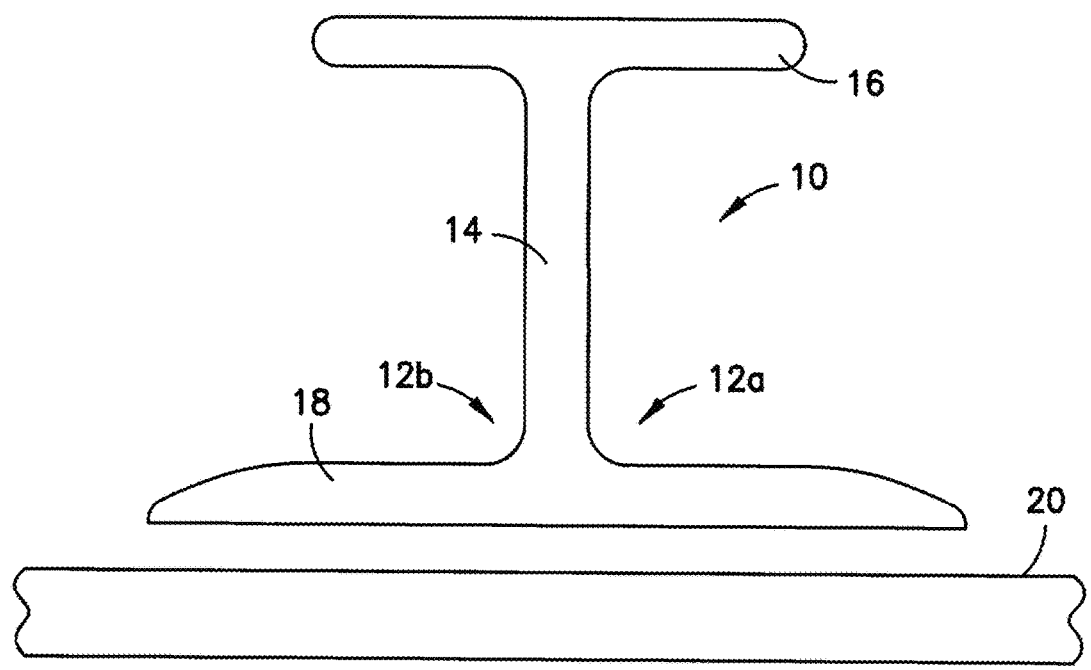
FIG. 1 is a diagram representing an exploded end view of a typical composite skin and I-shaped stringer assembly.

FIG. 1 is an exploded, partial cross-sectional view of a typical composite skin and stringer assembly. The composite skin and stringer assembly comprises an elongated stringer 10 having a web 14 that is positioned between a first flange 16 and an opposing second flange 18. The web 14 may have a height designed to provide a desired resistance to an applied loading. The first flange 16 and second flange 18 may be generally planar members. The web 14, first flange 16, and second flange 18 may be constant along a span of the stringer (i.e. into the page), or they may vary continuously or non-continuously along the span of the stringer 10. The web 14, first flange 16, and second flange 18 are formed from fiber-reinforced plastic material having multiple plies. The assembly also includes a skin 20 to which the second flange 18 is attached, using, for example, a suitable adhesive material. The skin 20 is also made of fiber-reinforced plastic material.

Prior to attachment of the stringer 10 to the skin 20, it is customary to inspect the stringer 10 for defects. In particular, each filleted region 12a/12b can be subjected to non-destructive inspection using a scanner platform that travels along the length of the stringer 10. In accordance with the embodiments disclosed herein, the scanner platform carries an ultrasonic probe that transmits focused ultrasound beams and forms a corresponding return signal for each echo returned to the probe.

Figure 2:
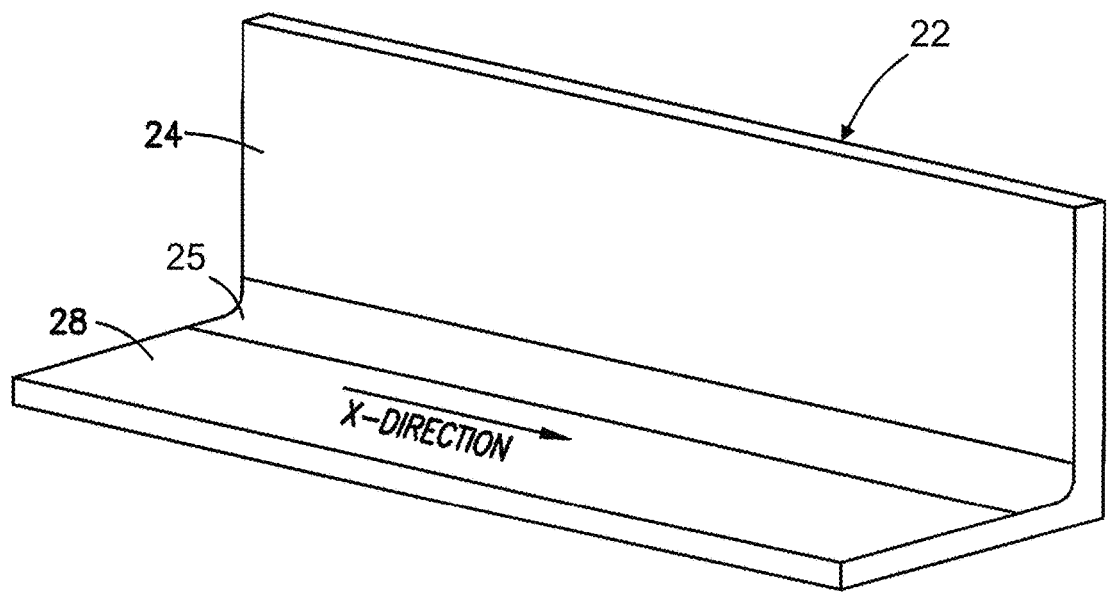
FIG. 2 is a diagram representing an isometric view of a portion of an L-shaped stringer with a circular radius. The arrow indicates a direction of travel of a scanner during inspection of the radius, which direction will be referred to herein as the X-direction.

In the example depicted in FIG. 1, the stringer 10 has an I-shaped cross-sectional profile. The NDI system disclosed herein also has application in the inspection of fillets of composite parts having alternative geometries. For example, FIG. 2 shows a portion of an L-shaped composite part 22 to be inspected. The composite part 22 comprises a web 24, a flange 28 (forming an obtuse angle with the web 24) and a fillet 25. Using the inspection technique disclosed herein, the fillet 25 can be scanned in a series of parallel planes normal to X and separated by equal distances. This is accomplished by moving an array sensor (not shown in FIG. 2) a predetermined incremental distance after each plane has been scanned. The scanner will travel along the length of the fillet 25 in an X-direction (indicated by the arrow in FIG. 2).

In accordance with the embodiments described hereinafter, multi-centric radius focusing inspection is used to inspect a radiused part having a variable radius dimension without mechanically adjusting the array sensor. A focal law is designed to electronically steer and focus ultrasound at a focal point calculated to be the center of a circular arc represent the profile of a radiused surface having a specified radius dimension. To inspect a radiused surface having a varying radius dimension, more focal laws are created corresponding to other specified radius dimensions. A file containing digital data representing the focal laws is written and stored in a non-transitory tangible computer-readable storage medium incorporated in the phased array instrument. Within the focal law file, there are timing delays for the transmission and reception of the ultrasound. These timing delays control the electronic firing of the ultrasonic transducers of the array sensor during transmission and the multiplexing of ultrasonic transducer outputs during reception. The multi-centric radius focusing inspection technique may also accommodate overlap of the different focal laws so a defect seen, for example, in the sensor data acquired when the focal law for one radius is applied would also be seen in the sensor data acquired when the focal law for another radius is applied.

Figure 3:
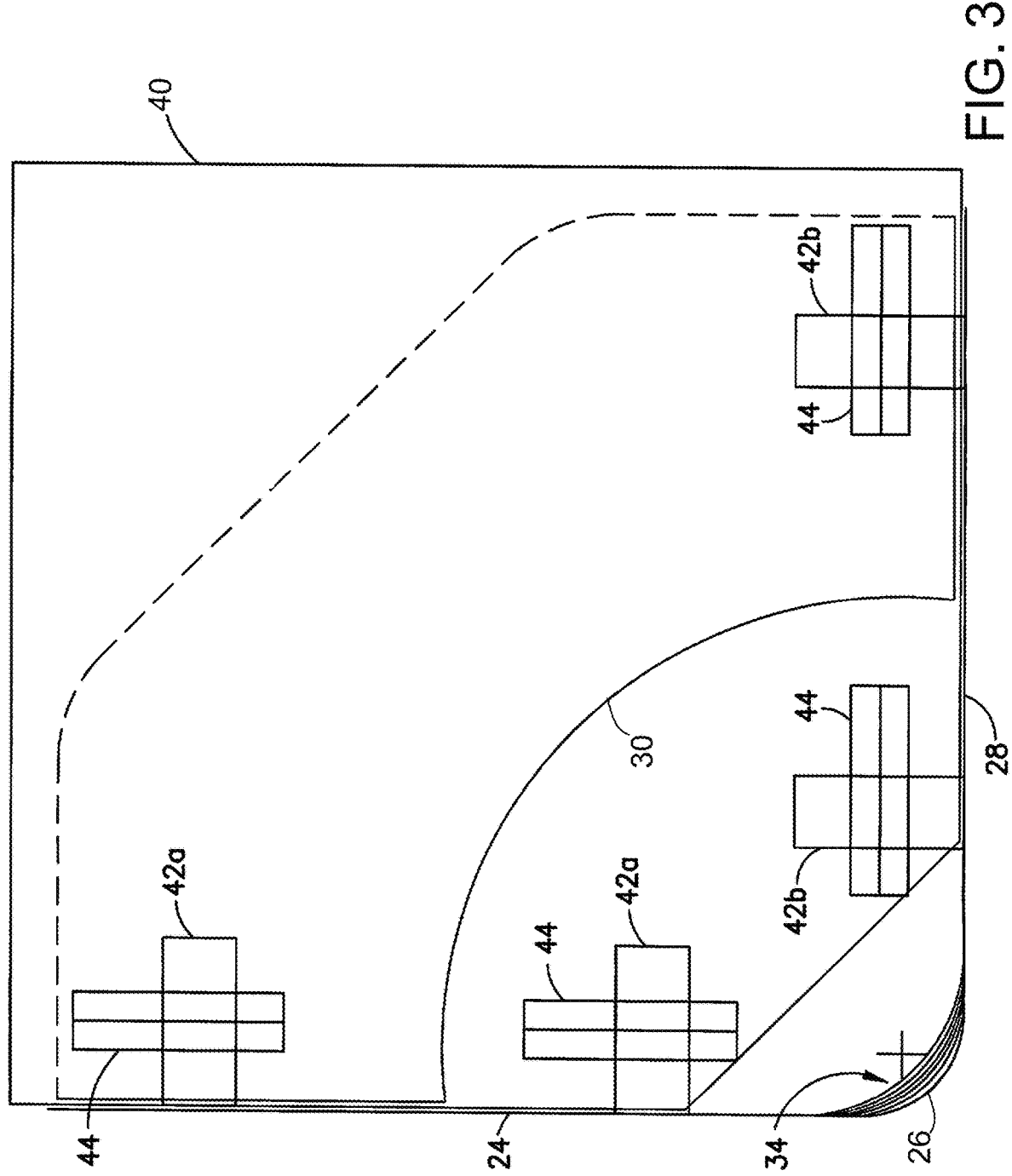
FIG. 3 is a diagram representing a CAD model of an inspection probe and a part having a radius to be inspected.

In accordance with the inspection methodology disclosed herein, the scanning system is programmed to transmit respective multiplicities of ultrasound beams in each scan plane, each multiplicity of ultrasound beams being focused at a respective focal point located between the array sensor and the radiused surface. The scan program is determined by first generating a cross-sectional CAD model (depicted in FIG. 3) of a probe body 40 in a predetermined position relative to a part designed to comprise a web 24 and a flange 28 (represented by respective straight lines in FIG. 3) connected by a filleted join region (hereinafter "fillet"). The fillet is designed to have a radiused surface whose cross-sectional shape is a circular arc. The CAD model further includes a curved line representing a curved array sensor 30 (hereinafter "array sensor 30") and lines representing a plurality of bearings comprising rollers 42a and 42b rotatably mounted on respective axles 44. The array sensor 30 is located in the probe body 40 and the probe body 40 is located relative to the radiused part, taking into account that respective sets of rollers 42 will be in contact with web 24 and flange 28, as seen in FIG. 3. Based on known geometry and dimensions of the probe and part, the position of the array sensor 30 relative to web 24 and flange 28 is known from the CAD model. The relative positions of individual transducers are included in these values determined from the CAD model. In other embodiments, the array sensor is straight and/or the probe has sliding contacts instead of bearings, which configuration will be incorporated in the CAD model.

In the cross-sectional CAD model depicted in FIG. 3, the radiused surface of the part to be inspected is represented by a family of circular arcs 34 which span an expected total range of variation of a radius of the radiused surface. For the purpose of illustration, an embodiment will be described in which the circular arcs 34 are non-concentric circular line segments having different radii. The circular arcs 34 intersect the web 24 and flange 28. Ideally, the web 24 and flange 28 have planar surfaces represented by straight lines in the cross-sectional CAD model. The circular arcs 34 are drawn in the CAD model so that the straight lines representing the surfaces of web 24 and flange 28 will be tangent to each of the circular arcs 34 at respective endpoints of the latter. If the filleted radius of the part is non-circular, actual surface shapes are entered into the CAD model. In one embodiment of the method, a family of non-circular shapes is entered from physical cross-sectional micro-photographs of the part to be inspected.

The method for inspecting a radiused part proposed herein uses multi-centric radius focusing. The inspection method is characterized by the following steps. First, a cross-sectional CAD model of a probe in contact with a radiused part comprising first and second planar surfaces connected by a radiused surface is generated. The probe includes an array sensor of transducer elements. The cross-sectional CAD model comprises first and second lines representing respective profiles of the first and second planar surfaces and a plurality of circular arcs which span an expected range of variation of a radius of the radiused surface of the radiused part, each of the circular arcs terminating at the first and second lines. A set of transmit focal laws are calculated which, when executed, will cause the array sensor to emit a plurality of beams focused at a plurality of focal points located at different distances from a center of the array sensor. The plurality of focal points correspond to respective centers of the plurality of circular arcs located at different distances from a center of a simulated array sensor of transducer elements. In addition, a set of receive focal laws are calculated which are designed to cause the array sensor to derive a plurality of parameter values characterizing strengths of echoes received following impingement of the plurality of beams on a radiused surface of the radiused part. The transmit and receive focal laws are stored in a non-transitory tangible computer-readable storage medium incorporated in the phased array instrument and then retrieved as needed during an inspection procedure.

During an inspection procedure, the probe body 40 will be placed in a position relative to the radiused part such that its position in a cross-sectional plane conforms to the relative position represented by the cross-sectional model shown in FIG. 3. As the probe body 40 moves in a lengthwise direction along the radiused part, the array sensor 30 is electronically adjusted taking into account variations in the radius dimension.

Figure 4:
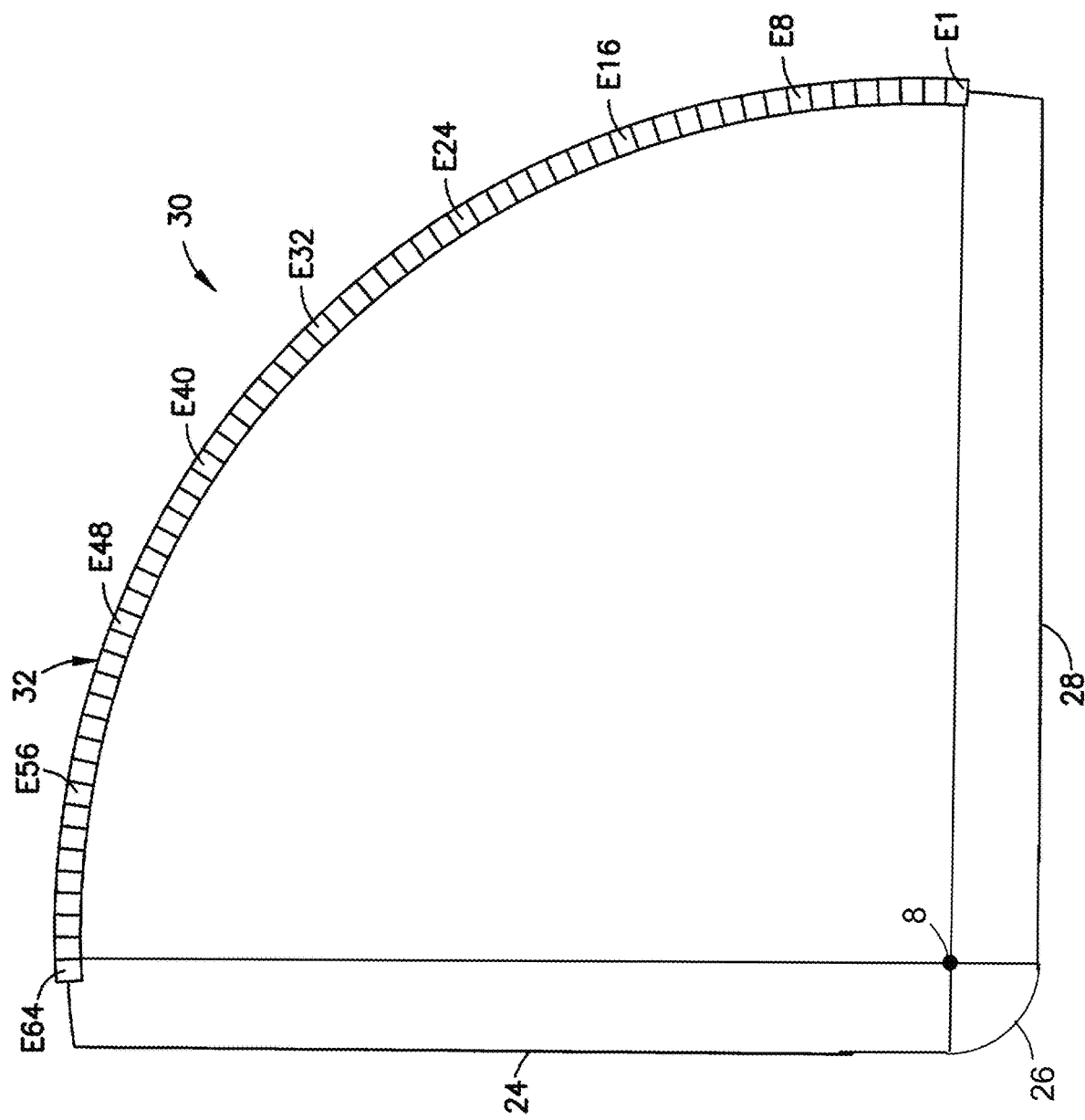
FIG. 4 is a diagram showing the position of a curved array sensor of ultrasonic transducer elements which is concentric with a radiused surface of a composite part being inspected.

In a traditional radius inspection, a curved array sensor is concentrically aligned with the radiused surface. FIG. 4 is a diagram showing the position of a curved array sensor 30 which is concentric with a radiused surface 26 of a fillet of a composite part being inspected. The array sensor 30 comprises a multiplicity of transducer elements 32 arranged side by side along a circular arc. In the example depicted, the array sensor 30 includes sixty-four transducer elements respectively numbered E1 through E64. In this situation, all the individual travel times of the ultrasound beams to the point of concentricity 8 are the same because transducer elements E1-E64 are all equidistant from the face of the array sensor 30.

In contrast, in accordance with the multi-centric radius focusing technique proposed herein, the curved array sensor need not be concentrically aligned with the radiused surface. Respective apertures of the transducer elements of the array sensor 30 are pulsed to transmit a plurality of beams respectively focused at the plurality of focal points in accordance with a set of transmit focal laws. After each beam of the plurality of beams is emitted, the transducer output signals from the transducer elements are processed in accordance with a set of receive focal laws to derive a set of parameter values characterizing strengths of echoes received following impingement of the plurality of beams on the radiused surface of the radiused part.

Figure 5:
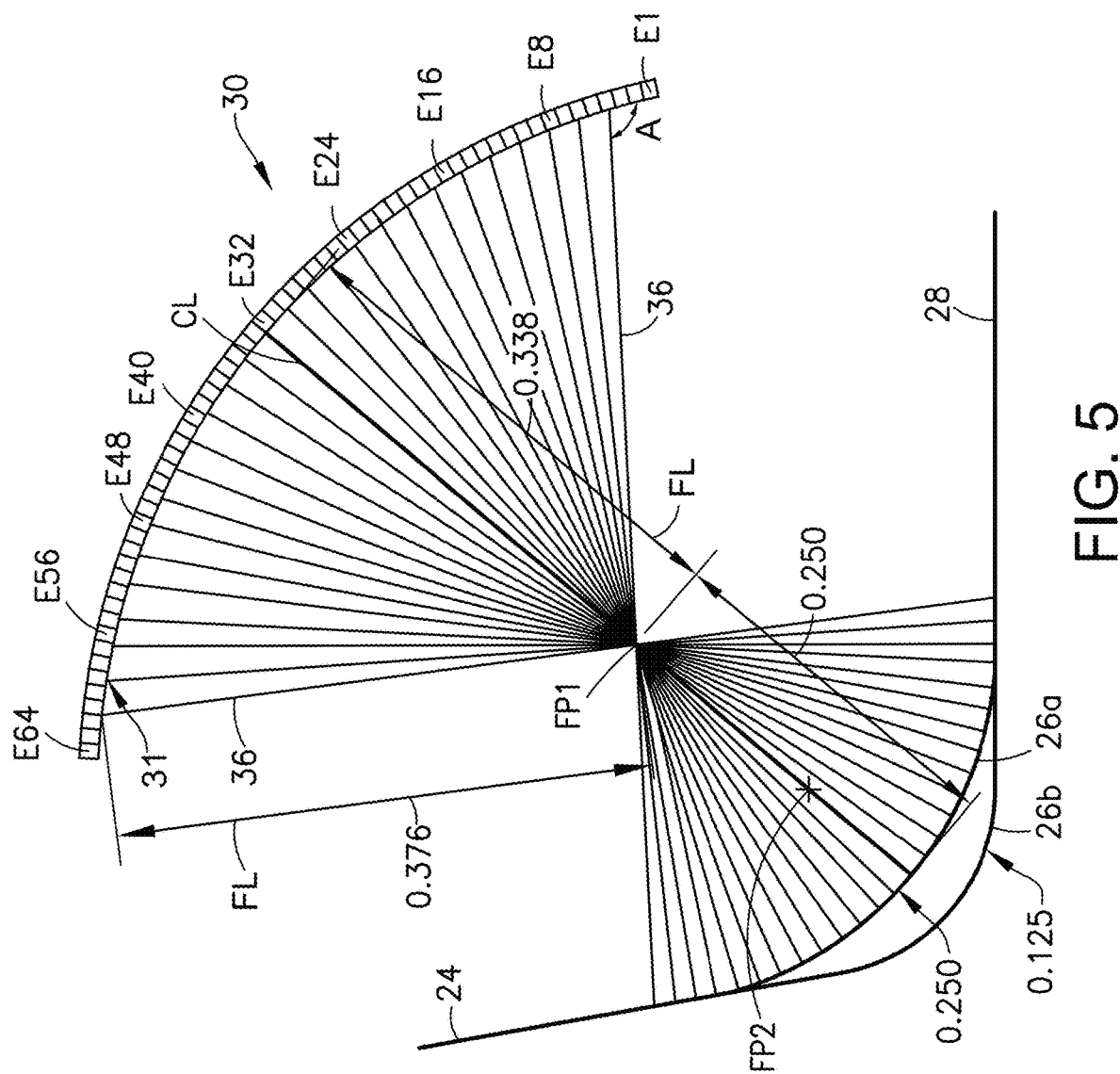
FIG. 5 is a diagram showing the position of a curved array sensor of ultrasonic transducer elements which is not concentric with a radiused surface of a composite part being inspected in accordance with the multi-centric radius focusing technique proposed herein.

FIG. 5 is a diagram showing the position of a curved array sensor 30 which is not concentric with either the radiused surface being inspected. In the example depicted in FIG. 5, the array sensor 30 includes sixty-four transducer elements respectively numbered E1 through E64. However, it should be understood that the non-destructive inspection techniques disclosed herein do not require that the array sensor have sixty-four transducer elements. The array sensor 30 could have more or fewer transducer elements. To form a focused ultrasound beam 36, only a subset of the transducer elements E1-E64 are pulsed. For example, a group of adjacent transducer elements E31-E42 can be sequentially activated in accordance with transmit focal laws designed to produce a focused ultrasound beam 36 having a specified focal length FL and steering angle A. Such a grouping of sequentially activated transducer elements will be referred to herein as an "aperture". As is well known to persons skilled in the art, for each transmitted beam the same aperture (e.g., aperture 31 of the array sensor 30) will be employed to detect the echo response and convert that echo response into a respective plurality of transducer output signals.

As is well understood in the art, one set of focal laws (hereinafter "transmit focal laws") are applied when the elements of an aperture are transmitting a beam, while another set of focal laws (hereinafter "receive focal laws") are applied when the same elements transduce the echo response to form a receive beam. The focal laws for transmitting versus receiving are different yet related by the fact that the receive focal laws are designed so that for each transmitted ultrasound beam 36 focused at a particular focal point, the array sensor detects a respective diverging ultrasound beam returned from the radiused part via the same focal point. For example, the time delays applied to elements E31-E42 for detecting a receive beam from the focal point will be the same as those for the beam transmitted by elements E31-E42 to the same focal point, but the sequence in which electrical echo data is acquired from elements E31-E42 will be the reverse of the sequence in which those elements were pulsed.

FIG. 5 shows a position of a curved array sensor 30 which is not concentric with either a radiused surface 26a (indicated by a continuous line) having a radius of 0.250 inch or a radiused surface 26b (indicated by a dashed line) having a radius of 0.125 inch. During a first transmit beamforming sequence (depicted in FIG. 5), transducer elements are pulsed to transmit (at different times) a plurality of ultrasound beams 36 focused at focal point FP1 in accordance with a first set of transmit focal laws. The focal point FP1 is located along a centerline CL of the array sensor 30 at a first distance from the array center. During a second transmit beamforming sequence (not depicted in FIG. 5), transducer elements are pulsed to transmit (at different times) a plurality of ultrasound beams focused at focal point FP2 in accordance with a second set of transmit focal laws. The focal point FP2 is located along the centerline CL of the array sensor 30 at a second distance from the array center which is greater than the first distance.

Respective echoes are returned from the radiused part to the same transducer elements that were pulsed. The detecting transducer elements convert the received ultrasonic energy into electrical transducer output signals. These transducer output signals are time-delayed by a ultrasonic pulser/receiver device (not shown in FIG. 5) in accordance with a set of receive focal laws using known gating techniques. The gated signals are then gain-corrected to compensate for different amounts of energy loss caused by transmission inefficiency at higher angles and then the gain-corrected signals are summed by the ultrasonic pulser/receiver device to form return signals representing parameter values characterizing the strengths of the echoes received from the radiused part.

In accordance with one proposed implementation of the multi-centric radius focusing technique depicted in FIG. 5, the previously described CAD model (depicted in FIG. 3) employs five circular arcs 34 which are not concentric. The respective radii of adjacent circular arcs 34 differ by a delta radius equal to 0.025 inch ($\Delta R = 0.025$ inch), resulting in a family of circular arcs 34 having the following radii: 0.125, 0.150, 0.180, 0.220, and 0.250 inch. Accordingly, the set of transmit focal laws includes five transmit focal laws designed to focus respective ultrasound beams 36 at respective focal points collocated at the centers of the circular arcs 34. In accordance with this proposed implementation, five focal laws are used to inspect a composite radiused part having a radiused surface that varies from 0.125 inch to 0.250 inch and each focal law handles roughly 0.03 inch of radius variation. For example, the center location for a radiused surface having a radius equal to 0.150 inch is 0.025 inch closer to the array sensor face than is the center location for a radiused surface having a radius equal to 0.125 inch. In addition, the multi-centric radius focusing inspection technique proposed herein is capable of accommodating overlap of the different focal laws so that an anomaly seen, for example, in the sensor data acquired when the focal law for an 0.125-inch radius is applied during interrogation would also be seen in the sensor data acquired when the focal law for an 0.150-inch radius is applied.

To focus a beam at a focal point not collocated with the center of the curved array sensor 30 without moving the array sensor 30, individual ultrasound waves emitted by respective transducer elements must travel different distances from the array sensor face to the focal point. This is done by applying timing delays to the individual elements of the array sensor 30 so that the ultrasound waves meet at the focal point simultaneously. FIG. 5 illustrates this by showing one outer element of the array sensor 30 that is further away (0.376 inch) from the focal point FP1 than the distance (0.338 inch) separating the center of the array sensor 30 from the focal point FP1. So the timing delay between the outer element and center element of the array sensor 30 would be (0.376−0.338)=0.038 inch divided by the velocity of ultrasound in inches per second.

Figure 6:
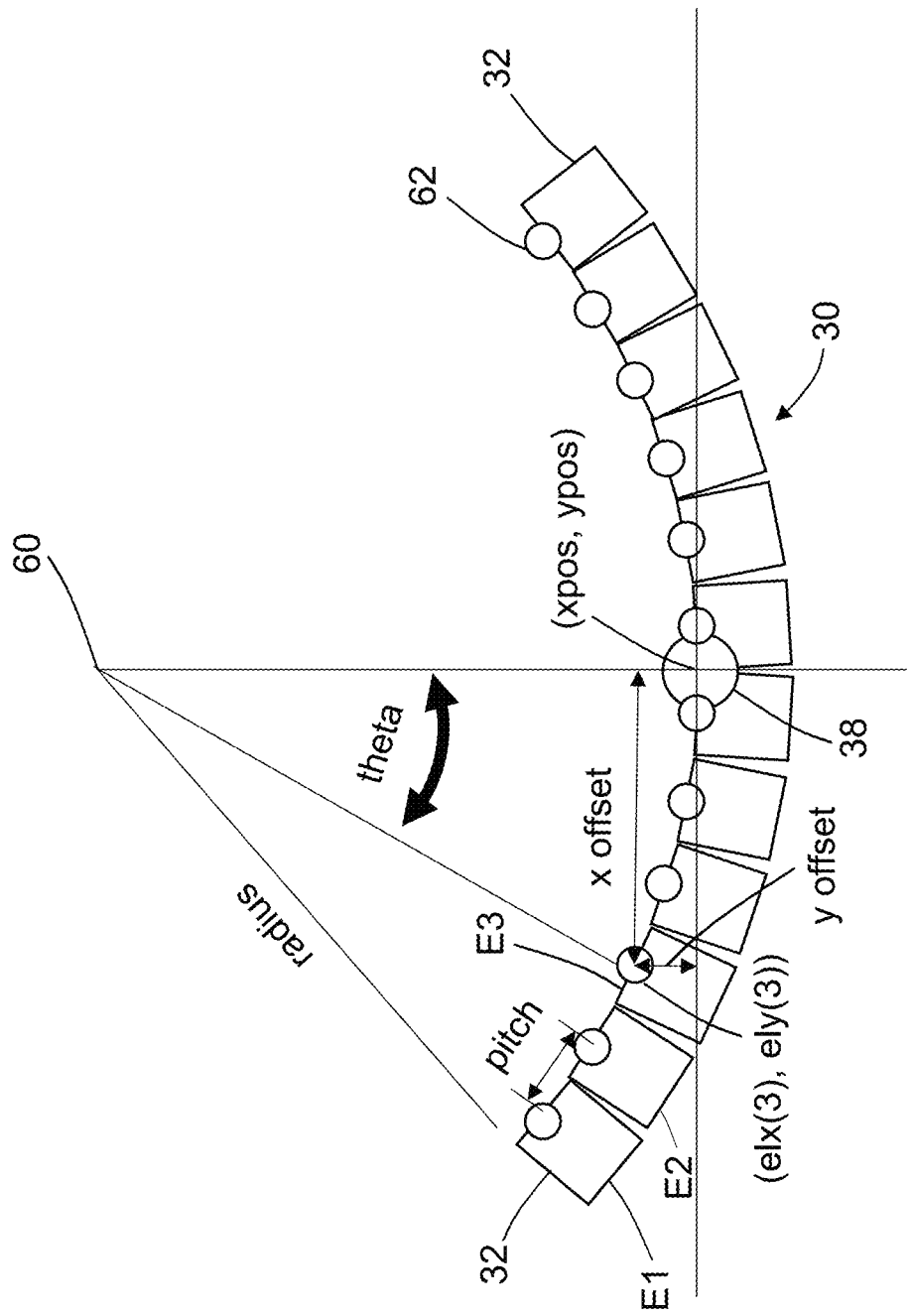
FIG. 6 is a diagram showing trigonometric relationships for deriving transducer element offsets used to calculate time delays to be incorporated in the focal laws associated with a curved array sensor.

Timing delays are calculated for each aperture for each focal point included in the multi-centric radius focusing scheme to be applied to a particular radiused part. A timing delay in the activation of first and second transducer elements may be calculated by first determining the difference between the respective distances separating the first and second transducer elements from the focal point and then dividing that difference by the velocity of ultrasound. The distances of each element to the focal point may be determined by respective offsets relative to the center of the array sensor face as shown in FIG. 6, which shows a curved array sensor 30 having a center of curvature 60 and an array center 38 with an equal number of transducer elements 32 on both sides. The coordinates of the array center 38 are (xpos, ypos). Each transducer element 32 has a transducer element center 62. The transducer element centers of adjacent transducer elements 32 are separated by a distance referred to herein as the "pitch". The distance from the center of curvature 60 to each transducer element center 62 is the radius of the array sensor 30.

Referring to FIG. 6, the time delay calculations follow angle theta trigonometric identities which may be represented by the following equations:

$$\text{arc len} = ((i-0.5)*\text{pitch}) - \text{ArrayARC}/2$$

$$\text{theta} = \text{arclen}/\text{radius}$$

$$elx = x\text{pos} + \text{radius}*\sin(\text{theta})$$

$$ely(i) = y\text{pos} + \text{radius}*(1-\cos(\text{theta}))$$

where "i" is the number of the transducer element; elx(i) and ely(i) are the coordinates of the transducer element center 62 of the i-th transducer element; "theta" is the central angle between a radial line from the center of curvature 60 to the transducer element center 62 of the i-th transducer element and a radial line from the center of curvature 60 to the array center 38; "arclen" is the arc length of a circular arc that subtends the central angle "theta" (measured in radians) and extends from the transducer element center 62 of the i-th transducer element to the array center 38; and "ArrayARC/2" is equal to one-half of the arc length of the array sensor 30. In the specific example depicted in FIG. 6, the angle theta is the angle between the radial line from the center of curvature 60 to the array center 38 and the radial line from the center of curvature 60 to the transducer element center 62 of the third transducer element number E3 (i=3). Thus, the x and y offsets for the i-th transducer element are functions of theta, namely:

$$x\text{offset} = \text{radius}*\sin(\text{theta})$$

$$y\text{offset} = \text{radius}*(1-\cos(\text{theta}))$$

Figure 7:
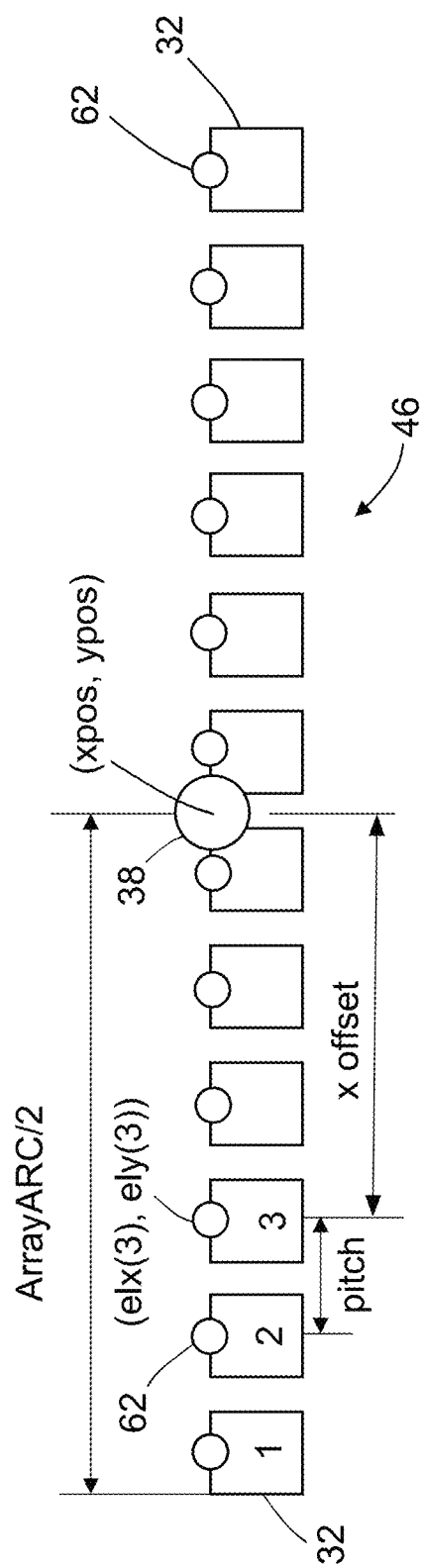
FIG. 7 is a diagram showing relationships for deriving transducer element offsets used to calculate time delays to be incorporated in the focal laws associated with a linear array sensor.

The offsets for calculating time delays for a linear array sensor 46 (shown in FIG. 7) may be calculated using the following equations:

$$elx(i) = x\text{pos} - \text{ArrayARC}/2 + ((i-0.5)*\text{pitch})$$

$$ely(i) = y\text{pos}$$

where "i" is the number of the transducer element; (xpos, ypos) are the coordinates of the array center 38; elx(i) and ely(i) are the offset coordinates of the transducer element center 62 of the i-th transducer element; "pitch" is the distance between the transducer element centers 62 of adjacent transducer elements 32; and "ArrayARC/2" is equal to one-half of the length of the linear array sensor 46. For flat array applications, yoffset becomes zero.

Figure 8:
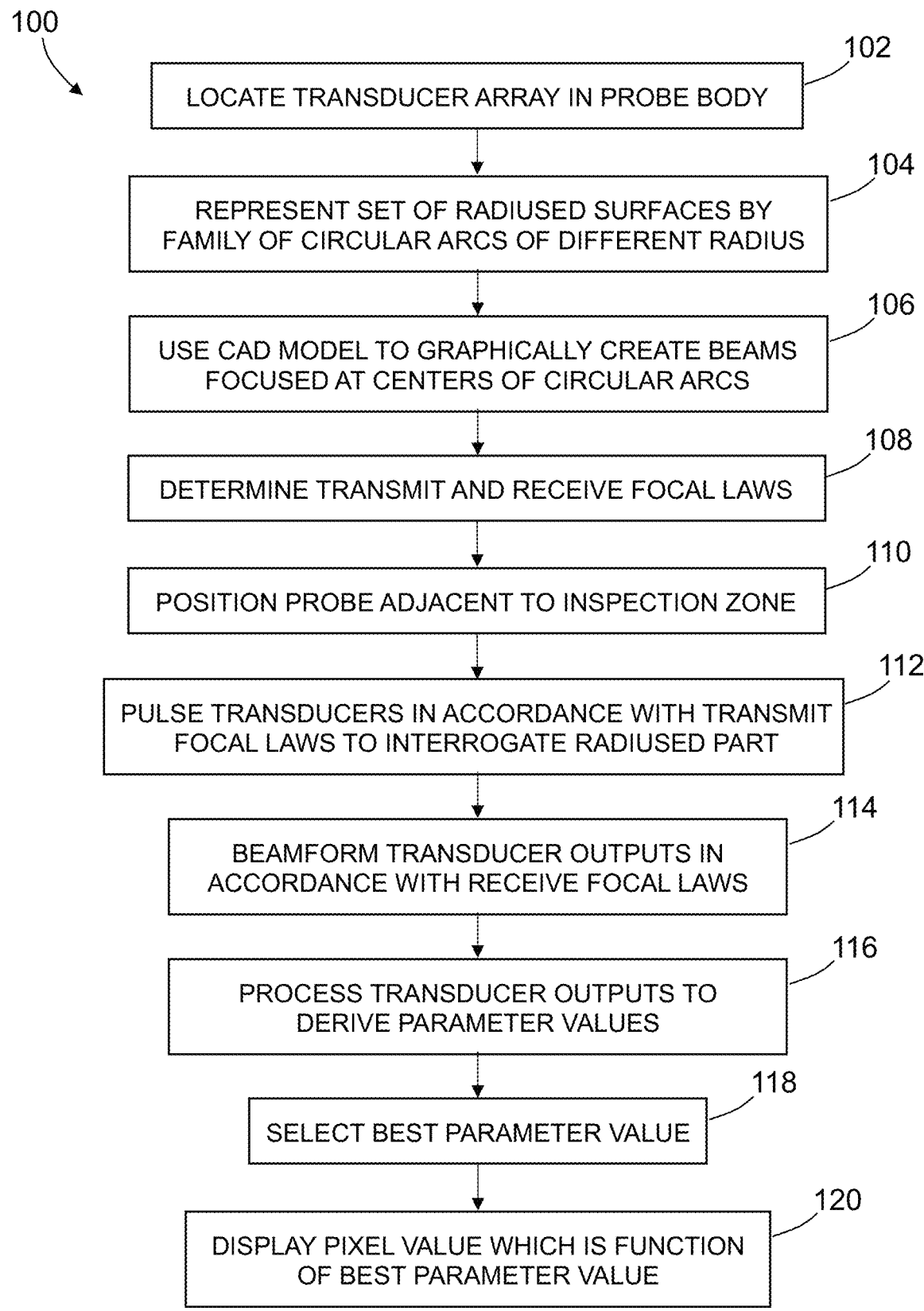
FIG. 8 is a flowchart identifying steps of a process for designing and implementing a system for multi-centric radius focusing inspection of a radiused part in accordance with one embodiment.

FIG. 8 is a flowchart showing steps of a process 100 for designing and implementing a system for multi-centric radius focusing inspection of a radiused part. The first stage in the process is to locate a curved array sensor in a probe body (step 102). Then a cross-sectional CAD model of the probe in contact with the part to be inspected is generated. The part may comprise non-parallel first and second surfaces (e.g., planar surfaces) connected by a radiused surface. The cross-sectional model comprises first and second lines representing respective profiles of the first and second surfaces. Because the true radius of the radiused surface of the part to be inspected is not known, the expected radius is represented in the CAD model by a family (plurality) of circular arcs having different radii which span an expected total range of variation of the radius (step 104). Each of the circular arcs terminates at the first and second lines.

Using the CAD model, ultrasonic beams focused at the centers of the circular arcs are graphically created (step 106). Using the defined beams, sets of transmit and receive focal laws are calculated (step 108). More precisely, a set of transmit focal laws are calculated for controlling the transducer elements to emit a multiplicity of beams respectively focused at a multiplicity of focal points collocated with the centers of the plurality of circular arcs. In addition, a set of receive focal laws are calculated which are designed to receive respective return signals representing respective echoes returned to the transducer elements via the multiplicity of focal points. These focal laws are then programmed into a pulser/receiver device to which the probe is connected.

Then the probe is positioned adjacent to the inspection zone (step 110). More specifically, the probe is placed in a position relative to the radiused part which conforms to the relative position represented by the cross-sectional CAD model. The scan plane of the array sensor is preferably perpendicular to the longitudinal axis of the part to be inspected. The probe can be moved intermittently in increments in a lengthwise direction starting at an initial position and stopping at a final position.

Still referring to FIG. 8, nondestructive inspection is carried out by pulsing one or more groups of transducer elements of the array sensor to transmit respective pluralities of beams which are respectively focused at the plurality of focal points in accordance with the transmit focal laws (step 112). As previously mentioned, different (possibly overlapping) apertures can be used to interrogate respective portions of the radiused part for each focal point. After each beam is emitted, the resulting echoes include ultrasound waves that impinge on the same transducer elements included in the transmission aperture for each beam. Those transducer elements will transmit the impinging ultrasound waves into electrical transducer output signals. Those transducer output signals are time delayed in accordance with the reception focal laws to form a receive beam (step 114). Optionally, the time-delayed transducer output signals are gain corrected. The transducer output signals are then processed to derive a respective set of parameter values for each focal point (step 116). For example, the parameter values derived may be the amplitude of the received beam. The best parameter values are then selected (step 118) and then converted into respective pixel values for display (step 120).

In general, steps 112, 114, and 116 of process 100 may be executed alternatingly during inspection of a convex or concave radiused part having non-parallel first and second planar surfaces connected by a radiused surface. The basic pattern of such alternating pulsing and processing may be characterized by the following steps performed after the probe body has been placed so that a scan plane of the array sensor intersects and is perpendicular to a lengthwise axis of the radiused surface: (a) pulsing respective apertures of the transducer elements of the array sensor to transmit a first plurality of beams focused at a first focal point and steered at respective steering angles in the scan plane, which first plurality of beams impinge on respective regions of the radiused surface; (b) after each beam of the first plurality of beams has been emitted, processing transducer output signals from the transducer elements of each aperture to derive a respective parameter value characterizing a strength of a respective echo returned from the radiused part following impingement of each beam of the first plurality of beams on the radiused surface; (c) pulsing respective apertures of the transducer elements of the array sensor to transmit a second plurality of beams focused at a second focal point and steered at respective steering angles in the scan plane, which second plurality of beams impinge on respective regions of the radiused surface; and (d) after each beam of the second plurality of beams has been emitted, processing transducer output signals from the transducer elements of each aperture to derive a respective parameter value characterizing a strength of a respective echo returned from the radiused part following impingement of each beam of the second plurality of beams on the radiused surface. In this example, the first focal point is collocated at a first center of curvature of a first circular arc having a first radius, the second focal point is collocated at a second center of curvature of a second circular arc having a second radius which is different than the first radius, and the first and second circular arcs are calculated in a frame of reference of the radiused part so that the first and second planar surfaces of the radiused part are tangent to each of the first and second circular arcs.

In accordance with one embodiment, the sets of ultrasound beams corresponding to the multiplicity of focal points are fired consecutively after a set distance of probe movement along the length of the radiused part (e.g., in the X-direction seen in FIG. 2). The set distance of probe movement serves as the scan resolution and this distance is obtained from an encoder attached to the mobile platform that carries the probe. In accordance with one implementation, each scan plane is perpendicular to the X-axis and separated from adjacent scan planes by the aforementioned set distance. This spacing determines the horizontal resolution of the pixel image to be displayed. Preferably the resolution is the same in the vertical direction.

Figure 9:
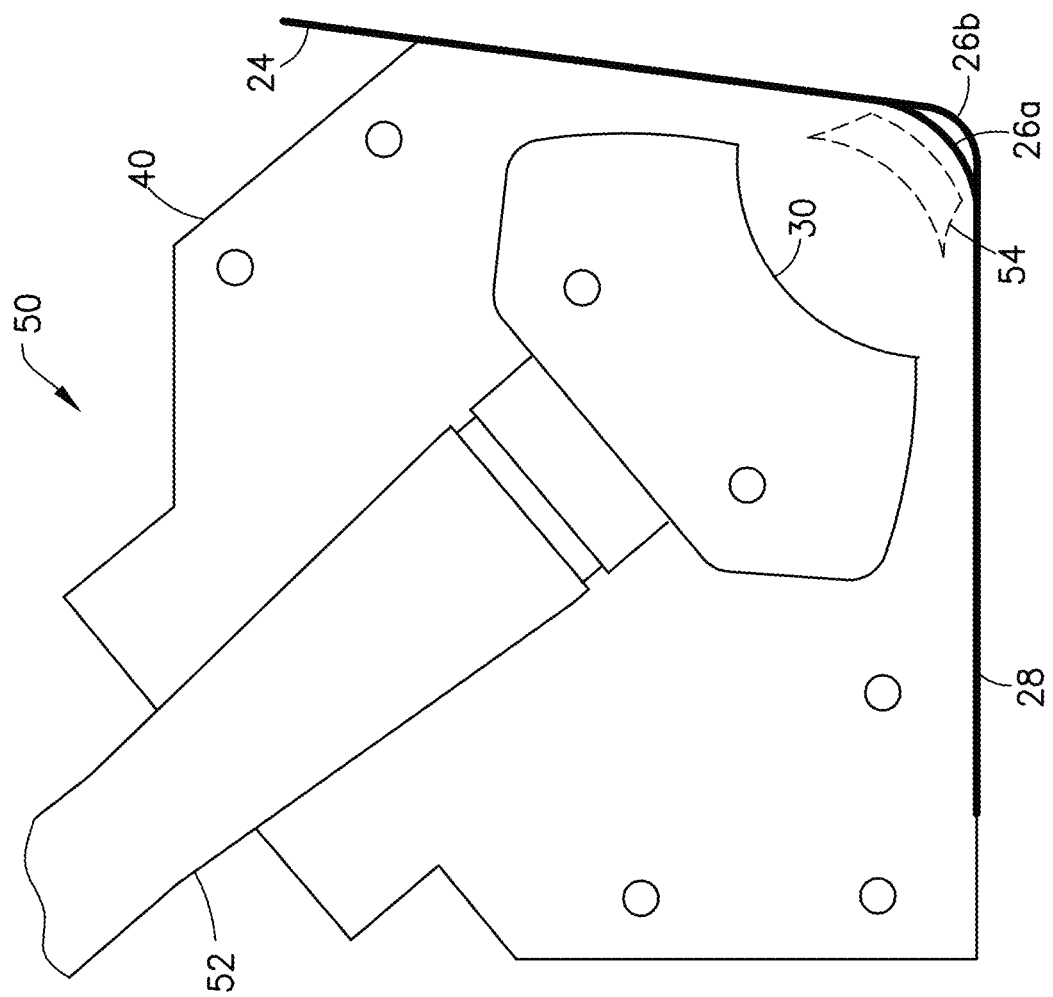
FIG. 9 is a diagram representing a side view of a mechanical probe designed to support a curved array sensor in a constant position during lengthwise scanning of a radiused part.

FIG. 9 is a diagram representing a side view of a mechanical probe 50 (hereinafter "probe 50") designed to support a curved array sensor 30 in a constant position during lengthwise scanning of a radiused part. The probe 50 includes a probe body 40 which is configured to house the array sensor 30. The array sensor 30 is electrically coupled to a pulser/receiver device (not shown in FIG. 9) by means of an electrical cable 52. The probe body 40 includes a water fitting 54 (indicated by dashed lines) that provides a column of water that flows between the array sensor 30 and the radiused part for acoustically coupling the radiused surface being inspected.

The probe body 40 is further configured to be seated against (in contact with) two portions of the radiused part (e.g., a web 24 and a flange 28) which have a constant spatial relationship (as opposed to the radiused surface of the filleted join region, which has a varying radius). The radius of the probe body 40 is designed for the largest radius of the application (0.25-inch radius in the illustration). There are two circular arcs at the filleted join region of the radiused part which represent radiused surfaces 26a and 26b which have respective radii of 0.250 inch and 0.125 inch. In reality, these two radius dimensions would not occur at the same place in the structure but the presence of two curves is intended to illustrate the concept of the radius dimension getting smaller underneath the probe housing. Since the probe body 40 (array sensor housing) is designed for the largest radius of the application, the structure's radius may then vary underneath the corner of the moving probe 50 without mechanically adjusting the probe 50. Using multicentric radius focusing allows compensation for the varying radius by adjusting the electronic focal point of the ultrasonic beams.

An array sensor (or series of array sensors) must be placed so that the outermost transducer elements used in the multicentric radius focusing method provide sufficient coverage of the filleted join region (a.k.a. "corner radius") to be inspected. This is done by drawing two straight lines from the two tangency points (TP) of the radiused surface (e.g., where the radiused surface meets a web and a flange), through the corresponding focal point (FP), and extending back to the face of the array sensor 30. Assuring that there are sufficient outer transducer elements to intercept the straight line is the goal for obtaining array sensor coverage. In practice, given a range of corner radii with their own respective centers of curvature (where the focal points are collocated), the farthest center of curvature (focal point) point from the face of the array sensor 30 is the limiting consideration for array sensor coverage. Data quality is affected by increasing beam steering angles needed to steer the ultrasound through the center of curvature (focal point).

Examples demonstrating the principle articulated in the immediately preceding paragraph are shown in FIGS. 10 through 15 for different array sensor/radiused surface configurations. Each of FIGS. 10-15 shows an array sensor (or array sensors) in spatial relationship with a pair of radiused surfaces. One radiused surface (26a or 56a) has a radius which is greater than the radius of the other radiused surface (26b or 56b). The tangency points TP1 are the points where the planar surfaces (not shown in FIGS. 10-15) of the radiused part are tangent to the radiused surface 26a (in FIG. 10-12) or 56a (in FIGS. 13-15). The focal point FP1 is collocated with the center of curvature of the radiused surface 26a or 56a. The tangency points TP2 are the points where the planar surfaces (not shown in FIGS. 10-15) of the radiused part are tangent to the radiused surface 26b (in FIG. 10-12) or 56b (in FIGS. 13-15). The focal point FP2 is collocated with the center of curvature of the radiused surface 26b.

Figure 10:
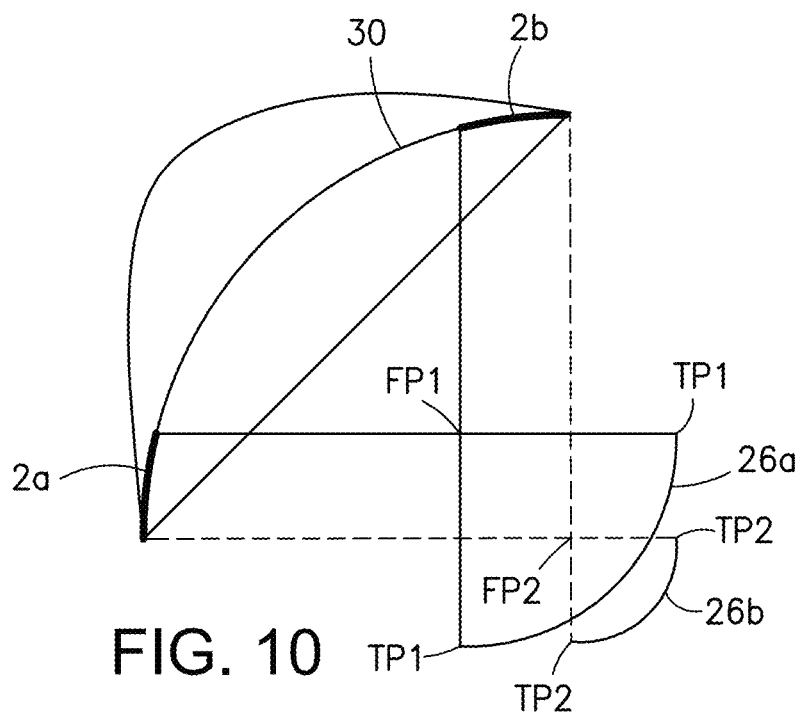
FIGS. 10 through 15 are diagrams illustrating examples of limits to inspection coverage for various array sensor/radiused surface configurations.

In FIG. 10, the array sensor 30 is curved and the radiused surfaces 26a and 26b are concave. The outermost portions 2a and 2b (indicated by bold circular arcs) of array sensor 30 provide sufficient coverage for the inspection of radiused surface 26b.

Figure 11:
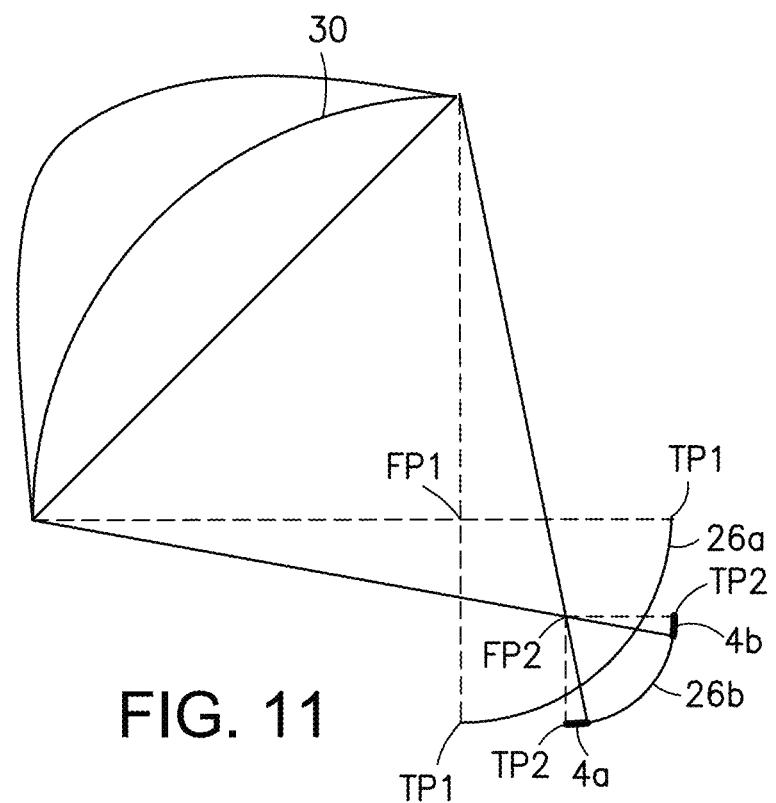

In FIG. 11, the array sensor 30 is curved and the radiused surfaces 26a and 26b are concave. The outermost portions 4a and 4b (indicated by bold circular arcs) of radiused surface 26b do not have coverage for this array sensor/radiused surface configuration.

Figure 12:
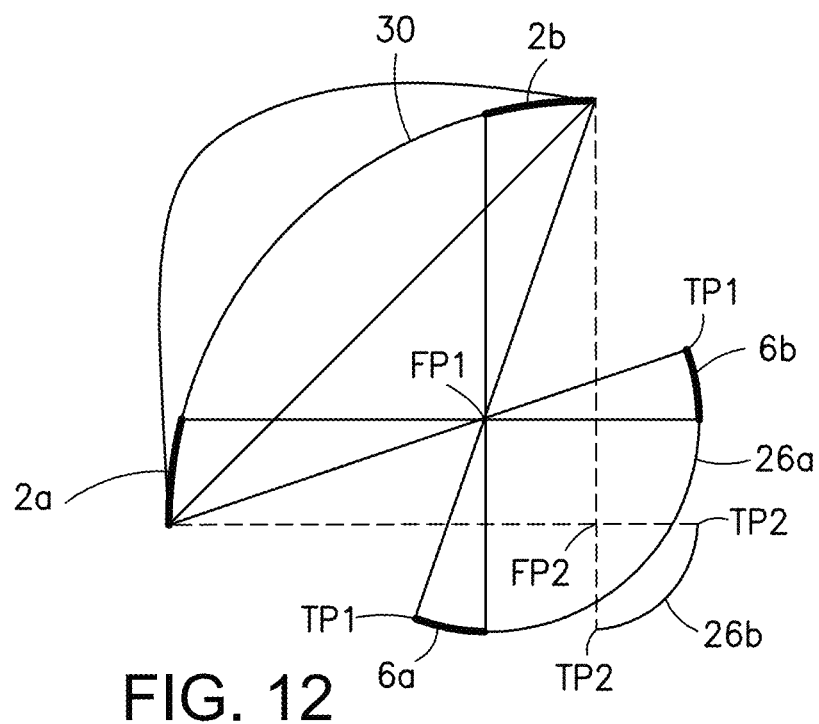

In FIG. 12, the array sensor 30 is curved and the radiused surfaces 26a and 26b are concave. The outermost portions 2a and 2b (indicated by bold circular arcs) of array sensor 30 provide sufficient coverage for the inspection of the outermost portions 6a and 6b (indicated by bold circular arcs) of obtuse radiused surface 26a.

Figure 13:
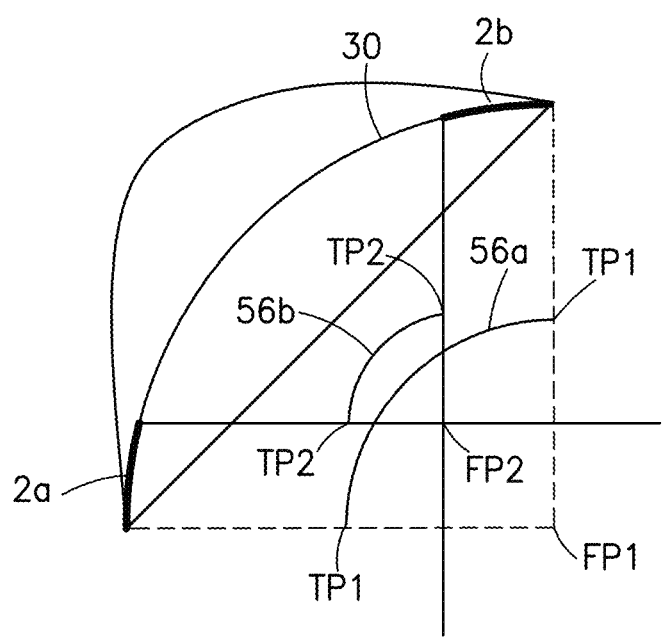

In FIG. 13, the array sensor 30 is curved and the radiused surfaces 56a and 56b are convex. The outermost portions 2a and 2b (indicated by bold circular arcs) of array sensor 30 provide sufficient coverage for the inspection of radiused surface 56a.

Figure 14:
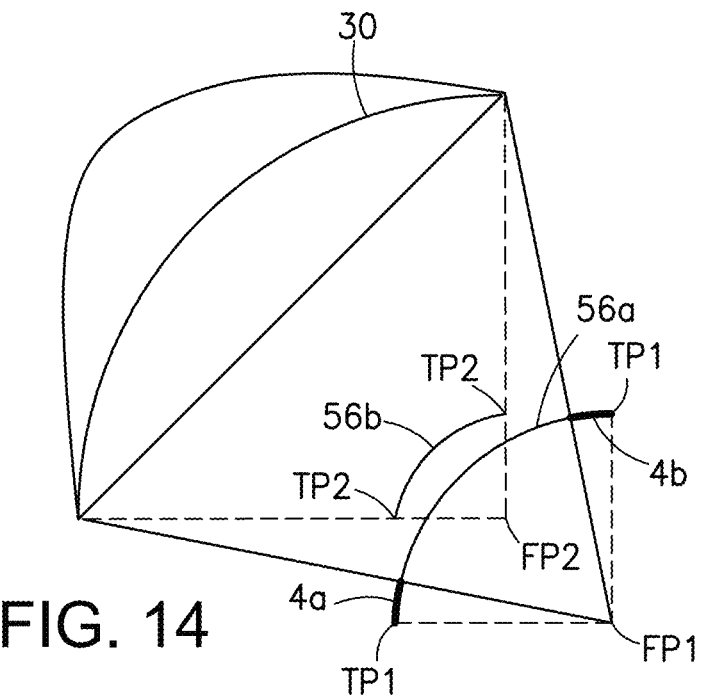

In FIG. 14, the array sensor 30 is curved and the radiused surfaces 56a and 56b are convex. The outermost portions 4a and 4b (indicated by bold circular arcs) of radiused surface 56a do not have coverage for this array sensor/radiused surface configuration.

Figure 15:
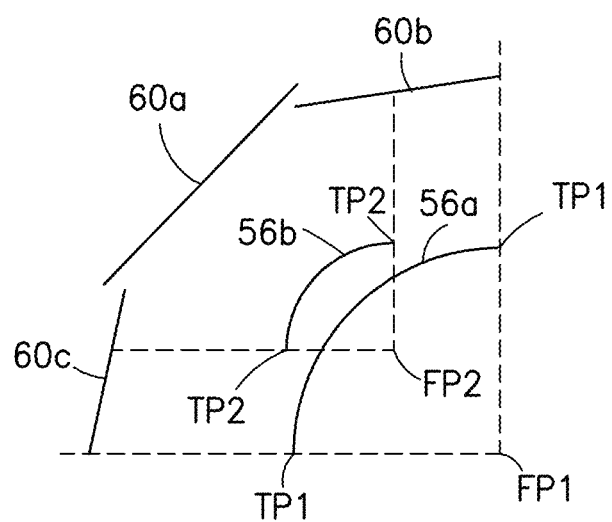

In FIG. 15, a set of linear array sensors 60a-60c are arranged as shown and the radiused surfaces 56a and 56b are convex. In the arrangement shown in FIG. 15, the set of linear array sensors 60a-60c provide sufficient coverage for both of the radiused surfaces 56a and 56b.

An apparatus for inspecting filleted join regions of an elongated composite part will now be described with reference to FIG. 16. The apparatus comprises a mobile radius scanner platform 70 that carries at least one array sensor 30. In accordance with one embodiment, the control system comprises a ground-based computer 84 programmed with motion control application software 86 and NDI scan application software 88. The control computer 84 is connected to an electronics box (not shown). The electronics box in turn is connected to the radius scanner platform 70 via a flexible electrical cable (not shown). The electronics box contains the system power supplies and integrates all the scanner control connections and provides an interface between the computer and radius scanner platform 70.

In accordance with one implementation, the computer 84 may comprise a general-purpose computer programmed with motion control application software 86 comprising a software module for controlling a drive motor 72 which causes the radius scanner platform 70 to move in the X-direction. The motion control application software 86 also controls a motor (not shown) of a cable management system 92. The cable management system 92 consists of two sets of motorized wheels (not shown) that respectively grip the cables connecting the operations control center to the radius scanner platform 70. The motor of the cable management system 92 is under computer control, which synchronizes the cables with the movement of the radius scanner platform 70, extending or retracting the cables as appropriate. In the alternative, the methodology disclosed and claimed herein can be employed using manual probes that have no motors.

Figure 16:
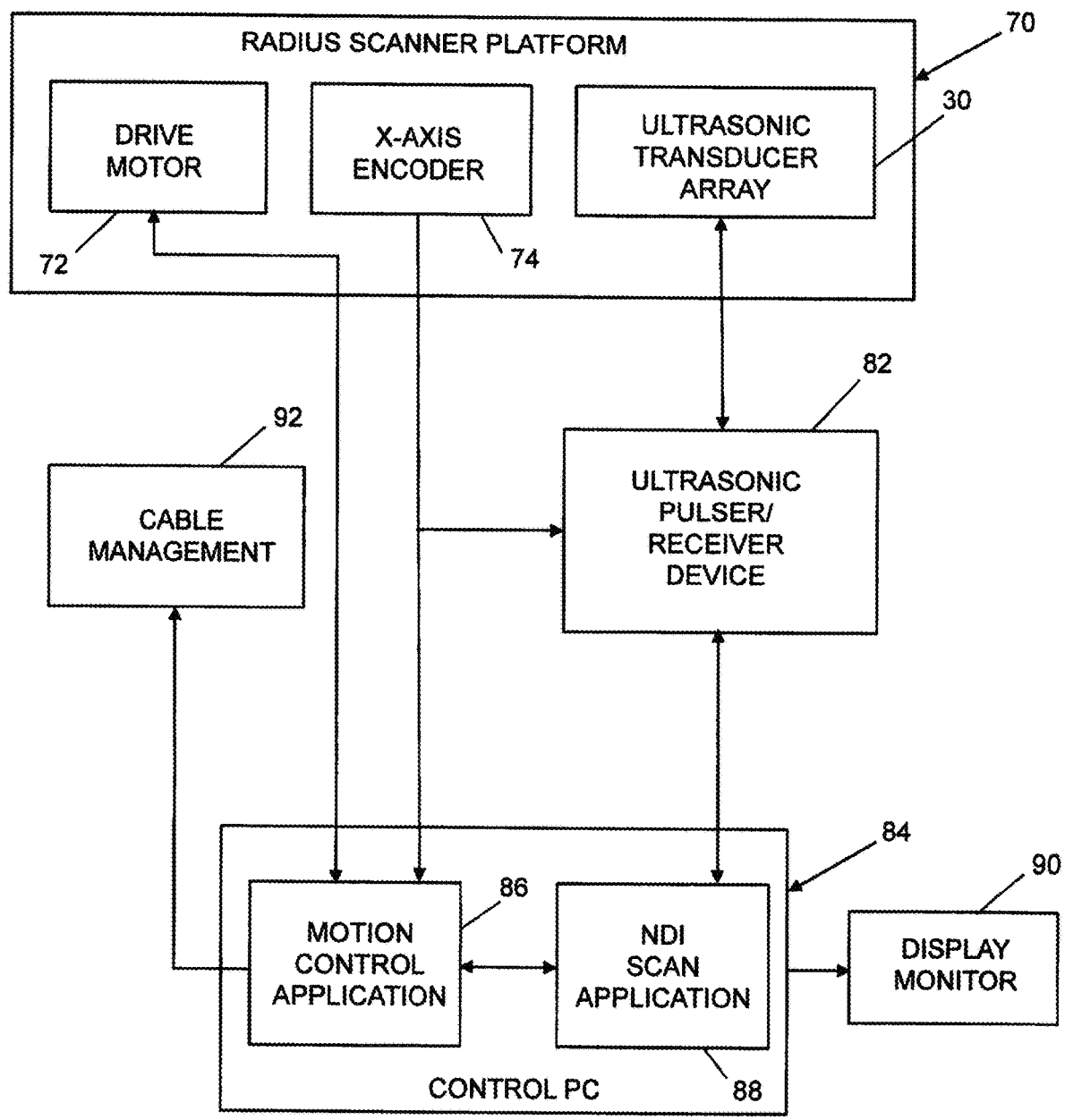
FIG. 16 is a block diagram showing a control system in accordance with one embodiment.
Figure 17A:
Figure 17B:
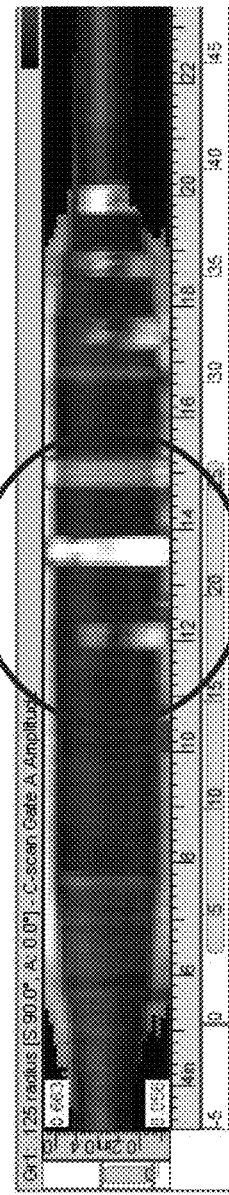
Figure 17C:
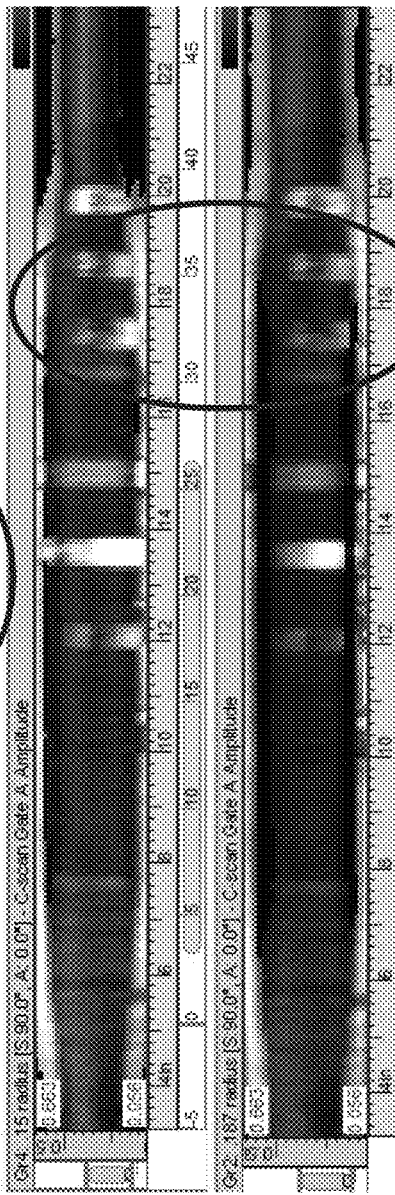
Figure 17D:
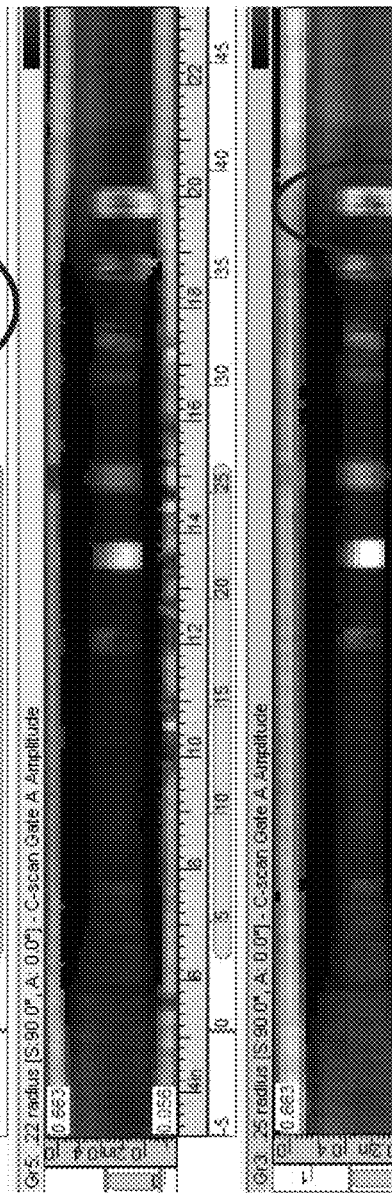
Figure 17E:

As seen in FIG. 16, an ultrasonic pulser/receiver device 82 is connected to the array sensor 30 for pulsing the transducer elements of an aperture and processing transducer output signals from the transducer elements of the same aperture in accordance with the pre-calculated focal laws. The ultrasonic pulser/receiver device 82 comprises a processor for running a software application that incorporates the respective pre-calculated focal laws for each focal point.

For example, the ultrasonic pulser/receiver device 82 is programmed to perform the following operations. First, the transducer elements of the array sensor 30 are pulsed in accordance with a first transmit focal law which is calculated to cause the array sensor 30 to emit a first beam focused at a first focal point located along a centerline of the array sensor 30. After the first beam is emitted, the transducer output signals from the transducer elements are processed in accordance with a first receive focal law which is calculated to cause the array sensor 30 to derive a first parameter value characterizing a strength of an echo received following impingement of the first beam on a radiused surface of the radiused part. Later the transducer elements of the array sensor 30 are pulsed in accordance with a second transmit focal law which is calculated to cause the array sensor 30 to emit a second beam focused at a second focal point located along the centerline of the array sensor. After the second beam is emitted, the transducer output signals from the transducer elements are processed in accordance with a second receive focal law which is calculated to cause the array sensor 30 to derive a second parameter value characterizing a strength of an echo received following impingement of the second beam on the radiused surface. The first focal point is at a first distance from a center of the array sensor 30 and the second focal point is at a second distance from the center of the array sensor 30 which is different than the first distance.

In accordance with the embodiment depicted in FIG. 16, an X-axis displacement encoder 74 is mounted to the radius scanner platform 70 (e.g., a rotational encoder attached to an idler wheel). Encoded X-axis position data from X-axis displacement encoder 74 (in the form of encoder pulses) is received by the ultrasonic pulser/receiver device 82, which in turn sends those encoder pulses to the NDI scan application software 88. The NDI scan application software 88 uses those pulses to position the scan data in the proper location on a display monitor 90.

The X-motion drive motor 72 can be a programmable stepper motor that can communicate with the computer 84 through a serial communications interface (not shown). The operator or automated path planning system specifies the desired incremental movements and an optional final goal position of the radius scanner platform 70 through the motion control application software 86. The X-axis positioning is controlled using proportional feedback of the encoder count data.

The NDI scan application software 88 includes ultrasonic data acquisition and display software that controls the ultrasonic pulser/receiver device 82. The ultrasonic pulser/receiver device 82 in turn sends pulses to and receives output signals from the array sensor 30. The NDI scan application software 88 controls all details of the scan data and the display of data. The pulser/receiver device 82 correlates the acquired ultrasonic scan data with the X-position information.

Ultrasonic inspection at the frequency used by the system disclosed herein requires the presence of an acoustic couplant between the array sensor and the inspected part. The scanning system shown in FIG. 16 uses water as the acoustic couplant. In accordance with one embodiment, the probe body has a water cavity (not shown) which is supplied with water via a water supply tube (not shown), which is also managed by the cable management system 92. The fluid acoustic couplant is supplied into a space between the curved array sensor 30 and the radiused surface of the part. Processing of the return signals may comprise applying respective gains to the respective return signals, the gains being selected to compensate for different amounts of energy loss caused by transmission inefficiency at higher angles. These respective gains may be a function of distance of travel of each echo through the fluid acoustic couplant. Another variable is response variation between different elements of the array sensor. Another variable is the number of elements used for each beam. Due to physical limits, the method may use six transducer elements per beam at the outer edge of the array sensor 30 as opposed to twelve elements per beam at the center of the array sensor.

The X-position of the array sensor 30 is measured by the X-axis displacement encoder 74, which encodes rotation of an encoder wheel (not shown) mounted to the carriage frame of the radius scanner platform 70. The encoder wheel rides on a surface of the part as the radius scanner platform 70 travels along a radius. The X-axis displacement encoder 74 sends an encoder pulse to the control computer 84 after each incremental movement of the radius scanner platform 70 in the X-direction, which encoder pulses are used by control computer 84 and by ultrasonic pulser/receiver device 82 to determine the X-coordinate of each scan plane in a well-known manner.

For one specific application involving the inspection of a soft-tooled radius of an integrally stiffened wing box, the above-described ultrasonic data acquisition/analysis system can be integrated into a non-destructive inspection system comprising: an active trailer vehicle that carries the array sensor(s) for inspecting the soft-tooled radius; an external motorized tractor used to move the active trailer vehicle through the tunnels of the wing box; one or more ultrasonic pulser/receivers connected to the array sensors; a computer that hosts the ultrasonic analysis, data acquisition and movement control software; and a monitor for displaying C-scan images of the inspected part.

The teaching disclosed above could ultimately replace many unique NDI probe designs with a single probe design. It could allow operators to scan the radius of a wing panel or fuselage stiffener without having to mechanically adjust the probe. As an example of cost savings, an inspection technique requiring three scan passes to inspect the radii of wing panel stringers could conceivably be replaced by a single-pass radius inspection method. Due to the large numbers of composite stiffeners incorporated in some modern airplanes, the methodology disclosed herein could reduce inspection costs significantly.

While methods and apparatus for ultrasonic inspection of a composite part using multi-centric radius focusing have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via electrical conductors or wireless transmissions. Such processing or computing devices typically include one or more of the following: a processor, a controller, a central processing unit, a micro-controller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for inspecting a radiused part having non-parallel first and second planar surfaces connected by a radiused surface, the method comprising:
    (a) placing a probe body in a position relative to the radiused part such that a scan plane of an array sensor comprising a multiplicity of transducer elements and supported by the probe body intersects and is perpendicular to a lengthwise axis of the radiused surface;
    (b) pulsing respective apertures of the transducer elements of the array sensor to transmit a first plurality of beams focused at a first focal point and steered at respective steering angles in the scan plane, which first plurality of beams impinge on respective regions of the radiused surface;
    (c) after each beam of the first plurality of beams has been emitted, processing transducer output signals from the transducer elements of each aperture to derive a respective parameter value characterizing a strength of a respective echo returned from the radiused part following impingement of each beam of the first plurality of beams on the radiused surface;
    (d) pulsing respective apertures of the transducer elements of the array sensor to transmit a second plurality of beams focused at a second focal point and steered at respective steering angles in the scan plane, which second plurality of beams impinge on respective regions of the radiused surface; and
    (e) after each beam of the second plurality of beams has been emitted, processing transducer output signals from the transducer elements of each aperture to derive a respective parameter value characterizing a strength of a respective echo returned from the radiused part following impingement of each beam of the second plurality of beams on the radiused surface,
    wherein the first focal point is collocated at a first center of curvature of a first circular arc having a first radius, the second focal point is collocated at a second center of curvature of a second circular arc having a second radius which is different than the first radius, and the first and second circular arcs are calculated in a frame of reference of the radiused part so that the first and second planar surfaces of the radiused part are tangent to each of the first and second circular arcs.

2. The method as recited in claim 1, further comprising:
    (e) pulsing respective apertures of the transducer elements of the array sensor to transmit a third plurality of beams focused at a third focal point and steered at respective steering angles in the scan plane, which third plurality of beams impinge on respective regions of the radiused surface; and
    (f) after each beam of the third plurality of beams has been emitted, processing transducer output signals from the transducer elements of each aperture to derive a respective parameter value characterizing a strength of a respective echo returned from the radiused part following impingement of each beam of the third plurality of beams on the radiused surface,
    wherein the third focal point is collocated at a third center of curvature of a third circular arc having a third radius different than the first and second radii, and the third circular arc is calculated in the frame of reference of the radiused part so that the first and second planar surfaces of the radiused part are tangent to the third circular arc.

3. The method as recited in claim 2, wherein the first and second radii differ by a first delta radius, the first and third radii differ by a second delta radius, and the first delta radius is equal to the second delta radius.

4. The method as recited in claim 1, wherein the parameter is amplitude.

5. The method as recited in claim 1, further comprising:
    determining a range of variation of a radius of the radiused surface, which range includes the first radius and the second radius which differ by a delta radius;
    locating the first focal point where a center of a first circular arc representing a profile of the radiused surface would be located if the radius of the radiused surface were the first radius; and locating the second focal point where a center of a second circular arc representing a profile of the radiused surface would be located if the radius of the radiused surface were the second radius.

6. The method as recited in claim 1, wherein the array sensor of transducer elements is curved.

7. The method as recited in claim 1, wherein the array sensor of transducer elements is linear.

8. The method as recited in claim 1, wherein the radiused surface is concave.

9. The method as recited in claim 1, wherein the radiused surface is convex.

10. An apparatus for inspecting a radiused part, the apparatus comprising:
an array sensor comprising a multiplicity of transducer elements;
a probe body that holds the array sensor; and
a pulser/receiver device programmed to perform operations comprising:
pulsing respective apertures of the transducer elements of the array sensor to transmit a first plurality of beams focused at a first focal point and steered at respective steering angles in a scan plane;
after each beam of the first plurality of beams has been emitted, processing transducer output signals from the transducer elements of each aperture to derive a respective parameter value characterizing a strength of a respective echo returned to the array sensor;
pulsing respective apertures of the transducer elements of the array sensor to transmit a second plurality of beams focused at a second focal point and steered at respective steering angles in the scan plane; and
after each beam of the second plurality of beams has been emitted, processing transducer output signals from the transducer elements of each aperture to derive a respective parameter value characterizing a strength of a respective echo returned to the array sensor,
wherein the first focal point is collocated at a first center of curvature of a first circular arc having a first radius, the second focal point is collocated at a second center of curvature of a second circular arc having a second radius which is different than the first radius.

11. The apparatus as recited in claim 10, wherein the array sensor of transducer elements is curved.

12. The apparatus as recited in claim 10, wherein the array sensor of transducer elements is linear.

13. The apparatus as recited in claim 10, wherein the probe body is designed for a largest radius of the radiused surface to allow inspection of smaller radii of the radiused surface without any mechanical adjustments.

14. The apparatus as recited in claim 10, further comprising a non-transitory tangible computer-readable storage medium storing a file containing digital data representing the first and second transmit focal laws and the first and second receive focal laws.

15. The apparatus as recited in claim 10, wherein the first and second circular arcs are calculated in a frame of reference of a radiused part so that first and second planar surfaces of the radiused part are tangent to each of the first and second circular arcs.

16. A method for inspecting a radiused part, the method comprising:
(a) generating a cross-sectional model of a probe in contact with a radiused part comprising first and second surfaces connected by a radiused surface, the probe comprising an array sensor of transducer elements, the cross-sectional model comprising first and second lines representing respective profiles of the first and second surfaces and a plurality of circular arcs which span an expected range of variation of a radius of the radiused surface of the radiused part, each of the circular arcs terminating at the first and second lines;
(b) calculating a set of transmit focal laws which, when executed, will cause the array sensor to emit a plurality of beams focused at a plurality of focal points located at different distances from a center of the array sensor, wherein the plurality of focal points correspond to respective centers of the plurality of circular arcs located at different distances from a center of a simulated array sensor of transducer elements;
(c) calculating a set of receive focal laws which are designed to cause the array sensor to derive a plurality of parameter values characterizing strengths of echoes received following impingement of the plurality of beams on a radiused surface of the radiused part;
(d) placing the probe in a position relative to the radiused part that conforms to the relative position represented by the cross-sectional model;
(e) pulsing respective apertures of the transducer elements of the array sensor to transmit a plurality of beams respectively focused at the plurality of focal points in accordance with the set of transmit focal laws; and
(f) after each beam of the plurality of beams is emitted, processing transducer output signals from the transducer elements in accordance with the set of receive focal laws to derive a set of parameter values characterizing strengths of echoes received following impingement of the plurality of beams on the radiused surface of the radiused part,
wherein the plurality of circular arcs comprise a first circular arc having a first radius and a second circular arc having a second radius which is greater than the first radius by a delta radius.

17. The method as recited in claim 16, wherein the plurality of circular arcs further comprise a third circular arc having a third radius that is greater than the second radius by the delta radius.

18. The method as recited in claim 16, wherein the parameter is amplitude.

19. The method as recited in claim 16, wherein timing delays of the transmit focal laws are derived from trigonometric identities relative to the center of the simulated array sensor.

20. The method as recited in claim 16, wherein the array sensor of transducer elements is curved and the radiused surface is concave.

* * * * *